March 24, 1953     P. N. SORENSEN     2,632,840
MEANS FOR INDUCTIVELY HEATING NARROW ELONGATED
PORTIONS OF CYLINDRICAL BODIES
Filed Nov. 4, 1948
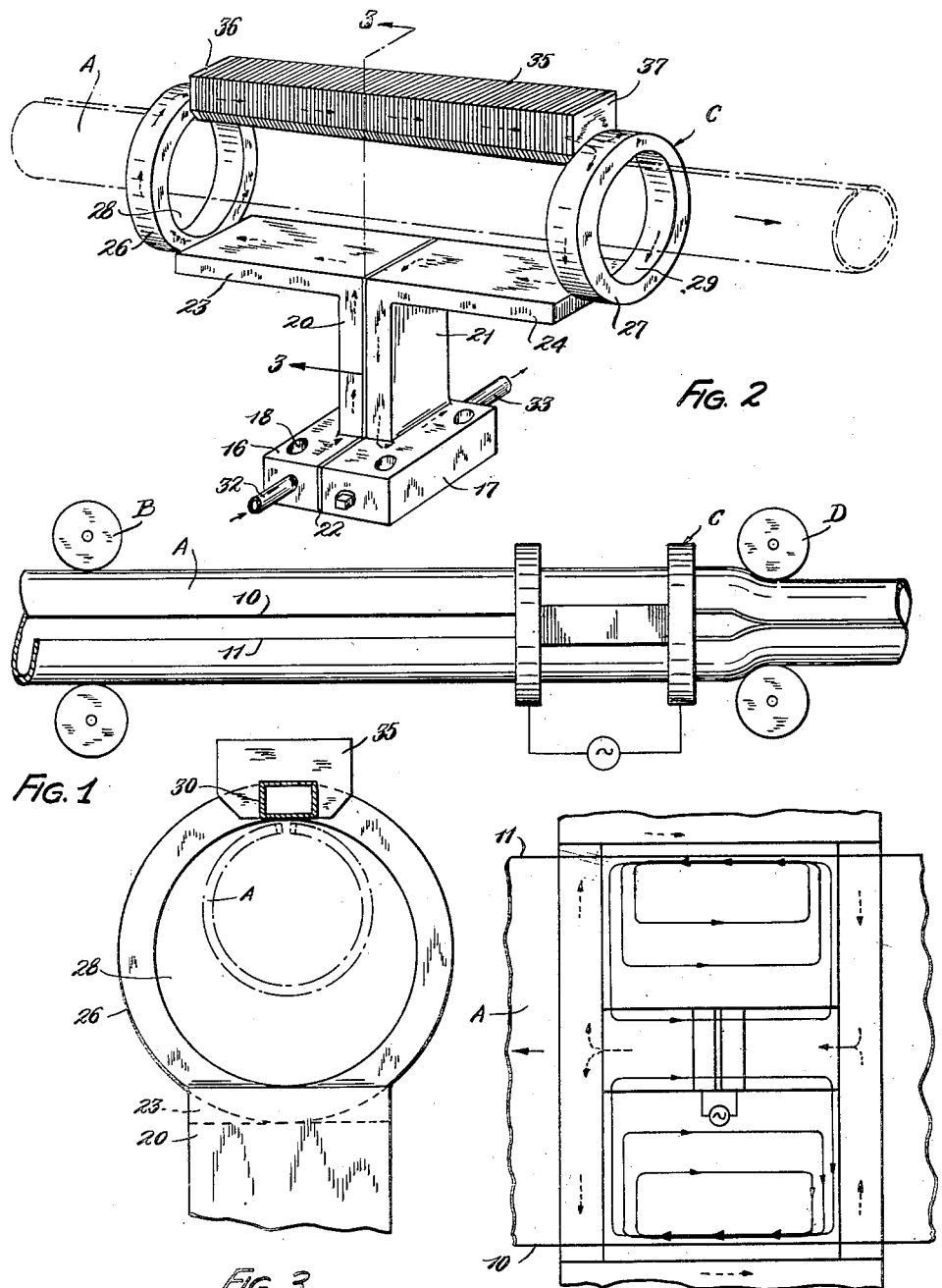
INVENTOR.
PHILLIPS N. SORENSEN
BY
Alfred C. Boely
ATTORNEY Patented Mar. 24, 1953

2,632,840

UNITED STATES PATENT OFFICE 2,632,840

MEANS FOR INDUCTIVELY HEATING NARROW ELONGATED PORTIONS OF CYLINDRICAL BODIES

Phillips N. Sorensen, Cleveland, Ohio, assignor to The Ohio Crankshaft Company, Cleveland, Ohio, a corporation of Ohio Application November 4, 1948, Serial No. 58,228

7 Claims. (Cl. 219—47)

This invention pertains to the art of high-frequency induction heating and, more particularly, to means for heating selected elongated portions of generally cylindrical members such as, but not limited to, the opposed edges of skelp before welding the edges thereof into a tube.

The present invention is applicable to many fields wherein narrow elongated portions of metallic articles must be rapidly and selectively heated. It is particularly adaptable to heating the opposed edges of skelp before the butt welding of same and will be described as applied to such an operation. It should be appreciated that the invention can also be used for selectively heating the welded section for the purposes of annealing or drawing the welded section subsequent to the welding operation.

In the past, many, many methods have been proposed for heating continuously the opposed edges of continuously moving skelp to bring these edges up to the welding temperature so that a weld may subsequently be effected having a strength comparable to that of the portions of the skelp remote from the strip. One method which has been proposed is the use of radiant or flame-type heating. With such methods, the rate of heating is relatively slow requiring either extremely long furnaces, or a relatively slow movement of the skelp through the furnace. In addition, the gases from the flames produce scale on the heated edges which, subsequently, interferes with the making of a perfect weld. Such types of heating are relatively inefficient as large amounts of heat are carried away with the gases of combustion.

Heating the edges by electrical means has also been proposed, which welds are primarily electric resistance-type welds wherein the heat is produced by electric currents being passed between abutted edges of the metal and as the resistance of the abutted edges is higher than the solid portions of the metal, the heat produced at the edges is sufficient to weld. The electric voltages across these edges to produce the heating currents have been introduced into the skelp in a number of ways: one by the use of pressure rolls bearing against the skelp adjacent the edges or, secondly, by using the skelp as a single secondary turn of a transformer.

With such types of electric welding, arcing across the abutting joints with the resultant pitting and scale formation results in imperfect welds. Also, as the edges of the skelp may not be exactly uniform or as there may be dirt or the like thereon, unevenness of heating results, with overheating in some places and underheating in others. Also, usually the size of the bead or flash formed is excessive and difficult to control.

Inducing high-frequency electric currents longitudinally along the edges has also been proposed. Heretofore, however, the edges have had electric currents induced therein which flow in opposite directions thereat simultaneously. Thus, there is a point of no currents centrally of the edge which must be heated by conduction. Additionally, such methods require the presence of an inductor internally of the skelp which, from a practical consideration, in many cases, becomes difficult. The electrical coupling of the inductor to the skelp is also relatively poor.

The present invention contemplates means for uniformly and rapidly bringing the edges of skelp to the welding temperature or for heating selected strips of bodies, which avoids the difficulties existent heretofore and which enables an improved and homogeneous weld to be obtained.

An object of the invention is the provision of a new and improved means for concentrating heating currents in the adjacent edges of skelp prior to butt welding.

Another object is the provision of a new and improved means for electrically heating opposed edges of skelp prior to butt welding wherein no voltage difference will exist between the edges and the detrimental effects of arcing and pitting are avoided.

Another object of the invention is to produce localized electric heating in sheets of metal wherein all the currents flow in a common plane, the heating currents being all unidirectional at any one instant of time and concentrated in a narrow path and the return currents being spread out over a considerable portion of the sheet remote from the heated edge.

Another object is to have all the heating currents in the edge to be heated flow in the same direction at any one instant.

Another object of the invention is the provision of a new and improved high-frequency inductor capable of heating opposed edges of skelp in a minimum of time and without producing a voltage differential between the edges.

Another object of the invention is the provision of a high-frequency inductor capable of rapidly heating opposed edges of skelp prior to butt welding.

Another object is the provision of an inductor comprising a pair of spaced end members having aligned openings therein through which the skelp is adapted to pass, the members being interconnected by a conductor, which conductor is adapted to be positioned adjacent the edges of the skelp, the end members at a point remote from the conductor being connected to a source of high-frequency electric current.

Still another object of the invention is the provision of a method of heating and welding the edges of skelp comprising passing the skelp through an inductor, inducing concentrated high-frequency currents to flow in the opposed edges of the skelp with the return path therefor being spread out through the remainder of the skelp and bringing the heated edges into pressure-welding engagement.

Generally speaking, the apparatus embodying the invention comprises a conductor of an inductor adapted to lie in close-parallel relationship with the edges to be heated with the connections of the conductor to the power source being remote from the edges but in closely-spaced relationship with the skelp, whereby to spread the flow of return currents out through the skelp.

The invention is embodied in certain parts and arrangement of parts, preferred embodiments of which are described in the specification and shown in the accompanying drawing which is a part hereof, and wherein:

Figure 1 shows a schematic view of apparatus embodying the present invention comprising skelp passing through a high-frequency inductor to have its opposed edges heated and thence through a pair of pressure rolls to weld the edges.

Figure 2 is an enlarged view of the inductor of Figure 1 embodying the present invention.

Figure 3 is a partial sectional view of Figure 2 on the line 3—3.

Figure 4 is a developed view of the skelp and inductor showing a distribution of the currents induced in the skelp relative to its edges and the inductor.

Referring now to the drawings wherein a preferred embodiment of the invention is shown for the purposes of illustration only, Figure 1 shows a skelp A being moved from a pair of driving and forming rolls B, through a high-frequency inductor C and thence through a pair of pressure rolls D. The skelp A shown is illustrative only and may be circular, elliptical or polygonal in cross-sectional shape and has a pair of spaced opposed edges 10 and 11. These edges 10 and 11 are to be heated to the welding temperature (in the region of 2400 degrees for normal carbon steels) and subsequently brought into pressure engagement, whereby a weld will be effected.

The driving and forming rolls B and welding rolls D comprise portions of a much more complex machine and are shown schematically. They may take any desired conventional form including suitable driving motors. Preferably, their speed of rotation is adjustable so that the speed of moving the skelp A through the high-frequency inductor C may be readily controlled. The primary function of the rolls D is to bring the edges 10, 11 into pressure engagement after the edges have been heated by passing through the inductor C. Preferably, some means of adjusting the distance between the rolls D and thus the pressure on the heated edges should be provided.

The high-frequency inductor C is shown in greater detail in Figures 2 and 3. Referring to Figure 2, the inductor C comprises a pair of terminal blocks 16, 17 which are adapted to be mounted on the terminal board of a suitable transformer by stud bolts (not shown) extending through stud holes 18. Extending upwardly from the terminal blocks 16, 17 are a pair of conductors 20, 21 which are preferably rectangular in cross section. They are disposed with the side of major dimension in slightly-spaced parallel relationship and insulated as are the terminal blocks 16, 17 by a thin layer of insulating material 22 such as mica or the like. These conductors are oftentime termed "fish tails" and extend upwardly within a short distance below the skelp A shown in this figure in dashed lines. The fish-tail conductors 20, 21 connect to a pair of conductors 23, 24 respectively, which extend in a horizontal opposite direction and parallel to the axis of the skelp A and in general proximity to the surface of the skelp opposite from the edges 10, 11. The ends of the conductors 23, 24 each connect to conductors 26, 27 extending vertically upward therefrom. These conductors may be generally in the form of rings with central openings 28, 29 in axial alignment through which the skelp A extends. The plane of the rings 26, 27 is transverse to the axis of the skelp A and the rings 26, 27 are attached or affixed eccentrically to the ends of the conductors 23, 24 such that the conductors 23, 24 do not extend across or interfere with the openings 28, 29. While the conductors 26, 27 are shown as O-shaped, they may take any other desired geometrical shape either to correspond with the cross-sectional shape of the skelp or otherwise. Also, the shape of the inner opening need not be similar to the external shape of the conductor.

Diametrically opposite from the point of attachment of the conductors 23, 24 to the rings 26, 27 another conductor 30 is affixed to the opposed sides of the conductors 26, 27 and extends therebetween. Preferably, the lower surface of this conductor is flush with the upper inner surface of the conductors 26, 27. The conductor 30 in the embodiment of the invention shown in Figure 2 and in the embodiment of the invention shown in Figures 2 and 3 is the principal conductor opposite which the maximum amount of heating is to be performed. As it is desired to heat the edges 10 and 11 only, these edges are symmetrically positioned in reference to the conductor 30 and extend in parallel close-spaced relationship thereto.

In construction, the terminal blocks 16, 17, the fish-tail returns 20, 21 and the remaining conductors 23, 24; 26, 27 and 30 are all preferably rectangular in cross section and have a hollow interior, all of which hollow interiors are in continuous communication with hollow interiors of the terminal blocks 16, 17. Cooling water in the embodiment shown is fed through terminal block 16 through a suitable water connection 32, thence through the various conductors and out of the terminal block 17, through a suitable water connection 33. Obviously, other forms of cooling-water connections can be made inasmuch as the method of cooling the block forms no part of the present invention.

High-frequency electric currents are circulated through the inductor through the terminal blocks, the direction of current flow for any one instant being indicated by the arrows in Figure 2. In order to increase the concentration of the flux opposite the edges 10, 11, the conductor 30 is provided with a plurality of thin generally U-shaped laminations 35. These U-shaped laminations in the figures are mounted in inverted position and surround the conductor 30 on three sides. They are stacked along the conductor 30 so as to preferably extend the entire length thereof. The ends of the legs are preferably cut away as shown to provide increased flux concentration. Copper plates 36, 37 are provided at each end of the stack of laminations to prevent actual contact of the laminations with the conductors 26, 27 and to shield the end laminations of the stack from the flux field of these last mentioned conductors.

It will be noted that the conductor 30 is of a smaller cross-sectional area than the other conductors and, particularly, the conductors 23, 24. By such a construction, the current density in the conductor 30 is greater than the current density in the conductors 23, 24 and, thus, the flux density therealong is also greater. In addition, the laminations 35 serve to considerably reduce the reluctance of the magnetic circuit about the conductor 30 and, thus, provide an even greater concentration of flux lines.

The currents flowing in the diametrically opposite halves of each of the conductors 26, 27 are in the same direction from the respective lower conductor to the upper conductor 30, or vice versa. Thus, voltage gradients in a circumferential direction in the skelp A are canceled out and very little, if any, high-frequency voltage will exist across the edges 10, 11 as a result of these conductors. As the cross-sectional area of the conductors 23, 24 is substantially greater than the conductor 30, the current density is, therefore, less and the flux field is, therefore, less, whereby currents induced in the skelp A caused by this flux field will be at a minimum. Also, any currents generated will flow over a substantial area such that a minimum of heating will occur.

As stated, the conductor 30 is intended to perform the principal heating action, although the conductors 23, 24 could also perform this function if the skelp were reoriented 180 degrees from the position shown in Figure 2. Preferably, the relative cross-sectional areas of the conductor 30 and conductors 23, 24 should be reversed.

The current-flow pattern induced in the skelp A by the inductor C is shown in greater detail in Figure 4. In Figure 4, the direction of the currents in the inductor at any one given instant is indicated by the dotted arrows. The currents induced to flow in the skelp A by this flow of current in the inductor C are indicated by the solid circular loops with arrowheads. It will, thus, be seen that the current flow to the left which is adjacent the edges 10, 11 is concentrated next to or immediately at or in the edges 10, 11, while the current flow to the right, which is the return current flow, is spread out a considerable area of the skelp. As the heating is substantially a function of the current density, it will be appreciated that the edges 10, 11 will become quickly heated, while the remaining portion of the skelp will be heated less, if at all. It will also be appreciated that because of the flow of currents in the same direction in both halves of the conductors 26, 27, there will be little or no circumferential voltages induced in the skelp A. Also, it will be noted that the current in the edge 10 is in the same direction as the current in the edge 11 and of an equal magnitude. Therefore, the edges 10 and 11 may be brought into engagement without any fear of arcing between the edges due to a difference of electrical potential therebetween.

It will be appreciated that the inductor shown is subject to many modifications. For example, the laminations may be omitted altogether or the conductor 30 may be formed with a large cross-sectional area and the conductors 23, 24 with a smaller cross-sectional area such that principal or concentrated heating will occur at this point. Thus, the edges 10 and 11 would be disposed adjacent the conductors 23, 24 rather than as is shown in Figure 2. The invention is subject to other modifications such as eliminating one-half of the conductors 26, 27, which halves should, preferably, be diagonally opposite halves of these conductors. The inductor may also be mounted in any position other than that shown.

The method of heating and welding described but not claimed in this application is claimed in my copending divisional application, Serial No. 205,730, filed January 11, 1951.

Thus, it will appear that an embodiment of the invention has been described which accomplishes the objects set forth hereinabove and many others. Alterations and modifications from the exact structure shown will occur to others upon a reading and understanding of the specification. It is my intention to have such modifications and alterations included as part of my invention insofar as they come within the scope of the appended claims.

Having thus described my invention, I claim:

1. A high-frequency inductor for heating a narrow band on a continuously-moving elongated metallic body comprising an elongated magnetically-permeable member generally inverted U-shaped in cross section and including a base and a pair of generally parallel side legs, an elongated conductor member between said legs and having a workpiece-facing surface on the side opposite said base adapted to be in close-spaced relationship with the surface of said material to be heated and a second conductor member in electrical series relationship with said other conductor member having an elongated workpiece-facing surface in spaced relationship to the workpiece-facing surface of said first-mentioned conductor member, said second conductor being substantially spaced from said first conductor and said magnetically-permeable member.

2. A high-frequency inductor for heating a narrow band on continuously-moving elongated lengths of metallic material comprising an elongated magnetically-permeable member generally U-shaped in cross section including a base and a pair of generally parallel legs extending from said base, an elongated conductor member between said legs and having a relatively narrow workpiece-facing surface on the side thereof opposite from said base and adapted to be in close-spaced parallel relationship to said material and a second conductor member substantially spaced from said magnetically-permeable material and said elongated conductor member in electrical series relationship with said first-mentioned conductor member and having a relatively wide elongated workpiece-facing surface spaced from the workpiece-facing surface of said first conductor member.

3. The combination of claim 2 wherein the workpiece-facing surface of the first-mentioned conductor member is generally in the same plane with the ends of said legs.

4. The combination of claim 2 wherein the workpiece-facing surface of said first-mentioned conductor member is generally in the same plane with the ends of said legs and the outer sides of said legs taper in a direction toward the end thereof.

5. A high-frequency inductor adapted to heat narrow bands on a continuously-moving elongated length of metallic material comprising magnetically-permeable material generally U-shaped in cross section including a base and a pair of generally parallel legs extending from said base, an elongated conductor member between said legs having a length slightly greater than the length of said magnetically-permeable material and having a workpiece-facing surface on the side thereof opposite from said base adapted to be in close-spaced relationship with said material to be heated, a pair of ring-like conductor members, one on each end of said conductor member, having aligned centers with the line of said centers on the side of said workpiece-facing surface and another conductor member attached to said ring-like conductor members at a point diametrically opposite from said first-mentioned conductor member, said last-mentioned conductor member having a workpiece-facing surface with an area substantially greater than the area of the workpiece-facing surface of said first-mentioned conductor member, one of said conductor members being divided and having terminals extending therefrom whereby said inductor may be energized.

6. A high-frequency inductor adapted to heat narrow, elongated portions on a metallic workpiece comprising first and second conductors angularly connected to each other, said first conductor being generally elongated and having a narrow elongated workpiece-facing surface, magnetically-permeable material positioned about the surfaces of said first conductor other than said workpiece-facing surface and along at least portions of its length, an end of said material being adjacent the point of connection of said conductors and flux-shielding means for said end having transverse dimensions relative to said first conductor at least as great as the transverse dimensions of said material relative to said first conductor.

7. The combination of claim 6 wherein said means comprise a copper plate.

PHILLIPS N. SORENSEN.

REFERENCES CITED

The following references are of record in the file of this patent:

UNITED STATES PATENTS

| Number | Name | Date |
| --- | --- | --- |
| 1,845,322 | Neuhauss | Feb. 16, 1932 |
| 1,915,047 | Blakeslee | June 20, 1933 |
| 1,981,629 | Northrup | Nov. 20, 1934 |
| 2,024,906 | Bennett | Dec. 17, 1935 |
| 2,144,378 | Kennedy | Jan. 17, 1939 |
| 2,408,190 | Baker | Sept. 24, 1946 |
| 2,419,619 | Wood | Apr. 29, 1947 |
| 2,428,303 | Wood | Sept. 30, 1947 |
| 2,439,517 | Johnson | Apr. 13, 1948 |
| 2,444,259 | Jordan | June 29, 1948 |
| 2,449,325 | Rudd et al. | Sept. 14, 1948 |
| 2,460,687 | Fuchs | Feb. 1, 1949 |
| 2,477,029 | Wood | July 26, 1949 |
| 2,483,973 | Goettings | Oct. 4, 1949 |
| 2,493,950 | Dow et al. | Jan. 10, 1950 |

FOREIGN PATENTS

| Number | Country | Date |
| --- | --- | --- |
| 616,063 | Great Britain | Jan. 14, 1949 |

OTHER REFERENCES

Curtis: "High Frequency Induction Heating," 1944, first edition, McGraw-Hill, pages 55, 66, 72 and 73.